Dec. 16, 1969  G. BAUMANN  3,483,656
PLANT RECEPTACLE FOR HYDROPONICS
Filed July 5, 1967
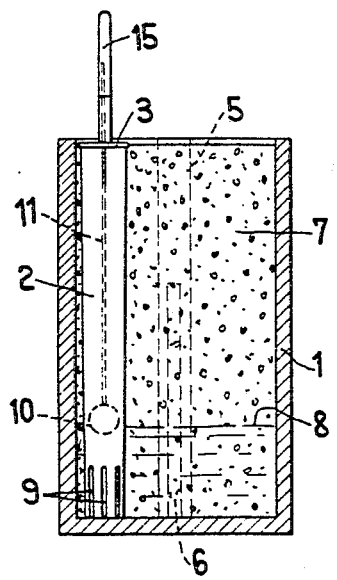
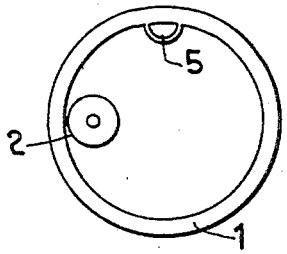
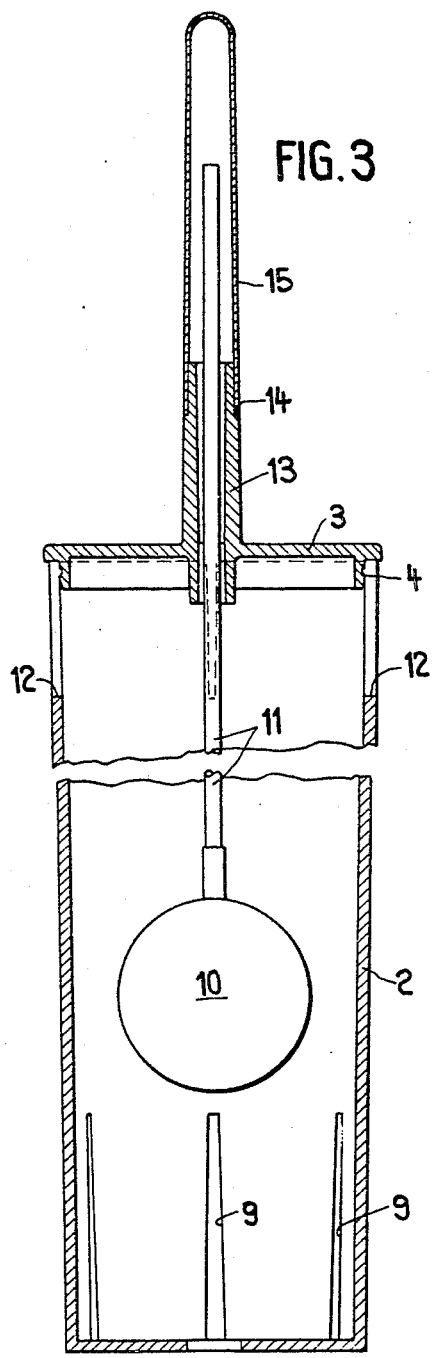
INVENTOR
Gerhard Baumann
BY
Edward T. Connors
Attorney

United States Patent Office 3,483,656
Patented Dec. 16, 1969

3,483,656
PLANT RECEPTACLE FOR HYDROPONICS
Gerhard Baumann, 71 Heimstrasse,
3018 Bumpliz, Switzerland
Filed July 5, 1967, Ser. No. 651,255
Claims priority, application Switzerland, July 14, 1966,
10,263/66
Int. Cl. A01g 31/02
U.S. Cl. 47—1.2
3 Claims

ABSTRACT OF THE DISCLOSURE

A plant receptacle for hydroponics to be filled with a substrate and a nutrient solution, comprising a water-level gauge container with a float therein carrying an indicator bar.

The invention concerns receptacles for hydroponics, that is, for the growing of plants with their roots immersed in an aqueous nutrient solution and established in some inert material of substrate, instead of in soil. Such receptacles comprise in their inside space to be filled with the substrate a water-level gauge having a container with a cover, a float carrying an indicator bar being provided in said container.

In prior plant receptacles of the above-mentioned kind the container of the water-level gauge extends from the bottom of the receptacle only along a small part of the height of the plant receptacle. Therefore, the cover of the gauge container lies at a low level within the substrate, i.e., is covered by a high layer of the substrate and the guide tube for the indicator bar, fixed to the cover, is entirely embedded in the substrates and is exposed to the lateral pressure exerted by the substrate and, therefore, exposed to deformation. The sight glass projecting from the top of the plant receptacle is likewise partly surrounded by the substrate and, therefore, runs the risk of being damaged. Within reach of the liquid the container of the water-level gauge has lateral openings, such as, for instance, slots in order that the nutrient solution can pass from the inside space of the receptacle into the gauge container to allow the float to indicate the actual water level. Experience has proved that the roots of the plants grow through these openings into the interior of the gauge container and clog the latter so that the water level indication is adulterated or even prevented. Substrate entering the slots may add to this inconvenience. If the gauge container must be cleaned from such roots and other obstructions there is no other possibility than to remove the substrate and also the plant or plants from the receptacle since there is no other way to reach the cover of the gauge container, which lies at a great depth beneath the upper surface of the substrate.

It is the aim of the present invention to remedy these inconveniences. The plant receptacle according to the invention is characterised in that the container of the water-level gauge, loosely inserted into the receptacle, extends at least approximately up to the upper edge of the plant receptacle and in that the float, after having removed the cover, is retractable from the gauge container while disposed in the receptacle filled with substrate.

In a special embodiment of the invention the guide tube for the indicator bar extends from the upper side of the cover upwardly and the sight glass or tube is mounted on the guide tube. In this case guide tube and sight tube lie entirely outside the substrate.

The accompanying drawing illustrates, by way of example, one embodiment of the plant receptacle according to the invention.

FIG. 1 is a vertical sectional view of the plant receptacle with the water-level gauge in elevation.
FIG. 2 is a top view to FIG. 1, and
FIG. 3 is a vertical sectional view of the container of the water-level gauge on a larger scale.

In the plant receptacle 1 of any suitable material the cylindrical container 2 of the water-level gauge is loosely inserted. This container 2 is supported on the bottom of the receptacle 1 and extends upwardly up to the upper end of the receptacle 1, where it is closed by a cover 3 with the help of snap means 4. In the receptacle 1 there is also a pouring-in channel 5 for the nutrient solution with a slot 6 serving also for increasing the oxygen supply to the roots of the plant or plants. The receptacle 1 is filled with substrate 7, such as, for instance, expanded or bloating clay or vermiculite, up to a level just beneath the cover 3. The nutrient liquid or solution with the level 8 can enter the gauge container 2 through the lower slots 9 thereof, so that the spherical float 10 carrying the indicator bar 11 falls or rises with the varying level 8. In order that the liquid level in the gauge container 2 is equal to that outside of the container, upper vent openings 12 are provided on its upper portion. These vent openings serve at the same time for an additional oxygen supply to the solution and therewith to the roots of the plant or plants.

The guide tube for the indicator bar 11 constitutes a hollow prolongation 13 made in one piece with the cover 3, the prolongation 13 mainly extending from the surface of the cover 3 towards the top. The prolongation 13 is not in contact with the substrate 7 and comprises a shoulder 14 on which the sight tube 15 is set. The sight tube 15 is preferably made from unbreakable, transparent material such as polystyrene. Also the sight tube lies entirely outside the substrate 7.

Nutrient solution is poured into the receptacle through the channel 5 as soon as the indicator bar 11 disappears in the sight tube 15. The channel 5 also serves for emptying the receptable. In another embodiment the channel 5 may be omitted and instead of it, a pouring in aperture on the cover 3 may be provided.

If, for instance, the slots 9 are clogged by the substrate and/or by roots of the plants which may even penetrate into the container 2, only the cover 3 has to be removed in that the prolongation 13 is taken hold of and the snap means 4 thereby disengaged, whereupon the indicator bar 11 with the float 10 is withdrawn. Afterwards, the obstructions can be removed from the gauge container 2 by means of suitable tools, after having cut at the inner wall of the container 2 the roots penetrating through the slots 9 by means of a suitable cutting tool. In order to finally remove the root stumps remaining in the slots 9, the container 2 must simply be slightly turned about its axis. After the cleaning operation during which the substrate 7 and the plant or plants remain in place, the float 10 with the indicator bar 11 is again inserted and the cover 3 pressed onto the container 2.

I claim:
1. A hydroponics receptacle of the type incorporating a fluid level gage positioned therein, the gage including a float and a gage container for the float, a removable cover for the float container, guide means in the cover, an indicating bar carried by the float and extending through the guide means in the cover, the gage container provided with slots on its lower part, substrate substantially filling the receptacle and abutting against the gage container, characterized in that the gage container extends upwardly from the bottom of the container to the upper edge thereof, the gage container having a generally cylindrical cross section over at least the majority of its length so that the container may be rotated about its own axis while in position in the substrate, means provided on the upper portion of the gage container defining at least one vent opening, the diameters of the container and of the float such that the float may be removed from the upper end of the gage container, said guide means for said indicator bar being a hollow prolongation extending upwardly from the gage container cover, means defining a shoulder on said prolongation, a sight tube supported by said shoulder, and snap means for removable attachment of said gage container cover, whereby in normal usage when roots grow into the slots blocking the flow of fluid therethrough the gage float may be removed from the top of the gage container so that the roots may be cut, the gage container then being rotated to remove the cut ends of the roots from the slots without disturbing the main body of roots.

2. A hydroponics receptacle according to claim 1 in which said float is spherical in shape.

3. A hydroponics receptacle according to claim 1 in which said cover of said gage container includes means defining an opening for nutrient solution.

References Cited

UNITED STATES PATENTS

| | | | |
|---|---|---|---|
| 124,207 | 3/1872 | Hess | 47—38.1 |
| 2,249,197 | 7/1941 | Brundin | 47—1.2 |
| 2,738,675 | 3/1956 | Blair | 73—322 |
| 3,222,819 | 12/1965 | Marcan | 47—38.1 |
| 3,370,468 | 2/1968 | Healy | 137—558 XR |

OTHER REFERENCES 397,318  2/1966  Switzerland.

ROBERT E. BAGWILL, Primary Examiner

U.S. Cl. X.R.

73—322; 137—558